Figure 1:
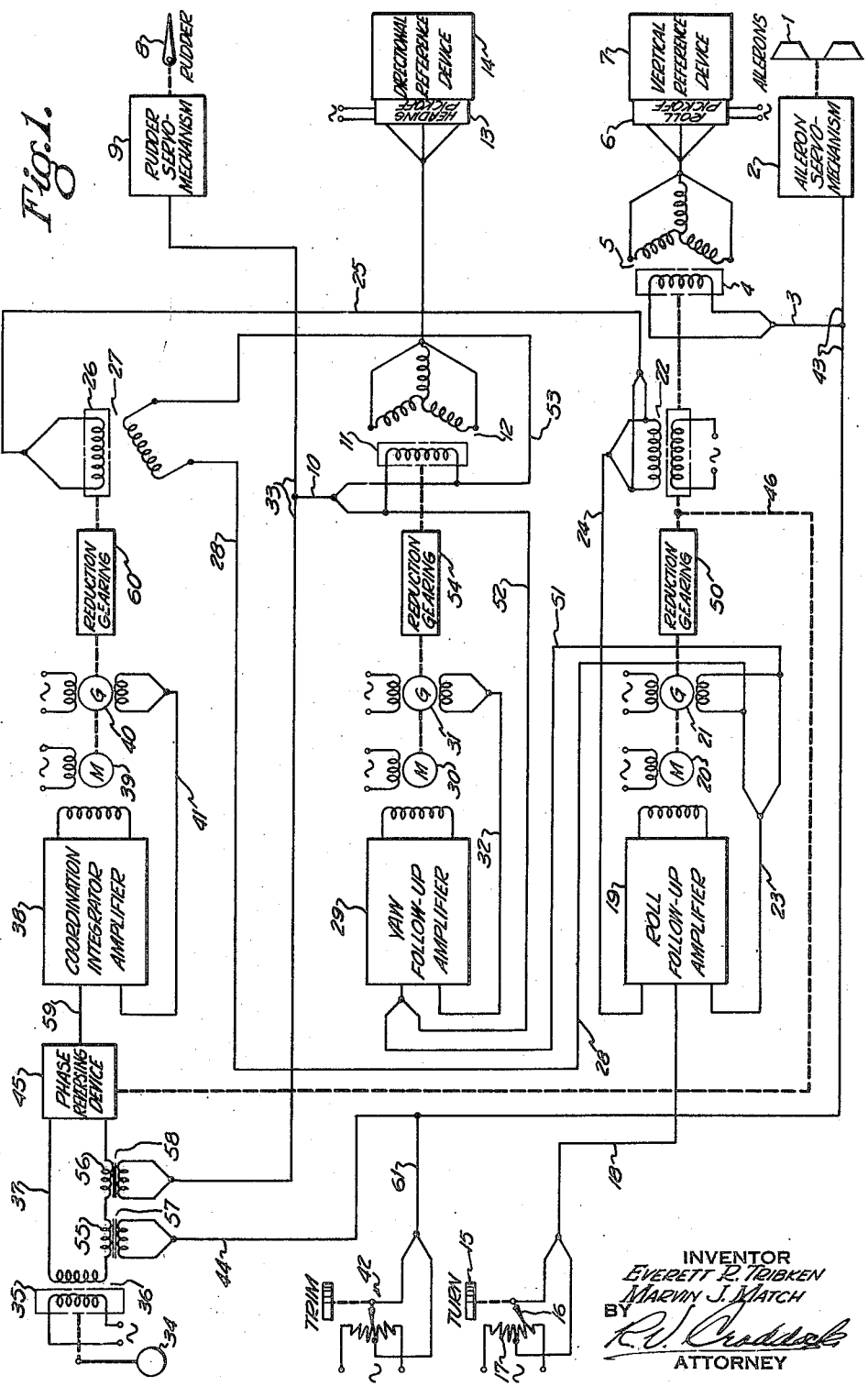

April 8, 1958

E. R. TRIBKEN ET AL 2,829,848

AIRCRAFT CONTROL SYSTEM

Filed March 31, 1954

2 Sheets-Sheet 1

INVENTOR
EVERETT R. TRIBKEN
MARVIN J. MATCH
BY
ATTORNEY

April 8, 1958   E. R. TRIBKEN ET AL   2,829,848
AIRCRAFT CONTROL SYSTEM
Filed March 31, 1954   2 Sheets-Sheet 2
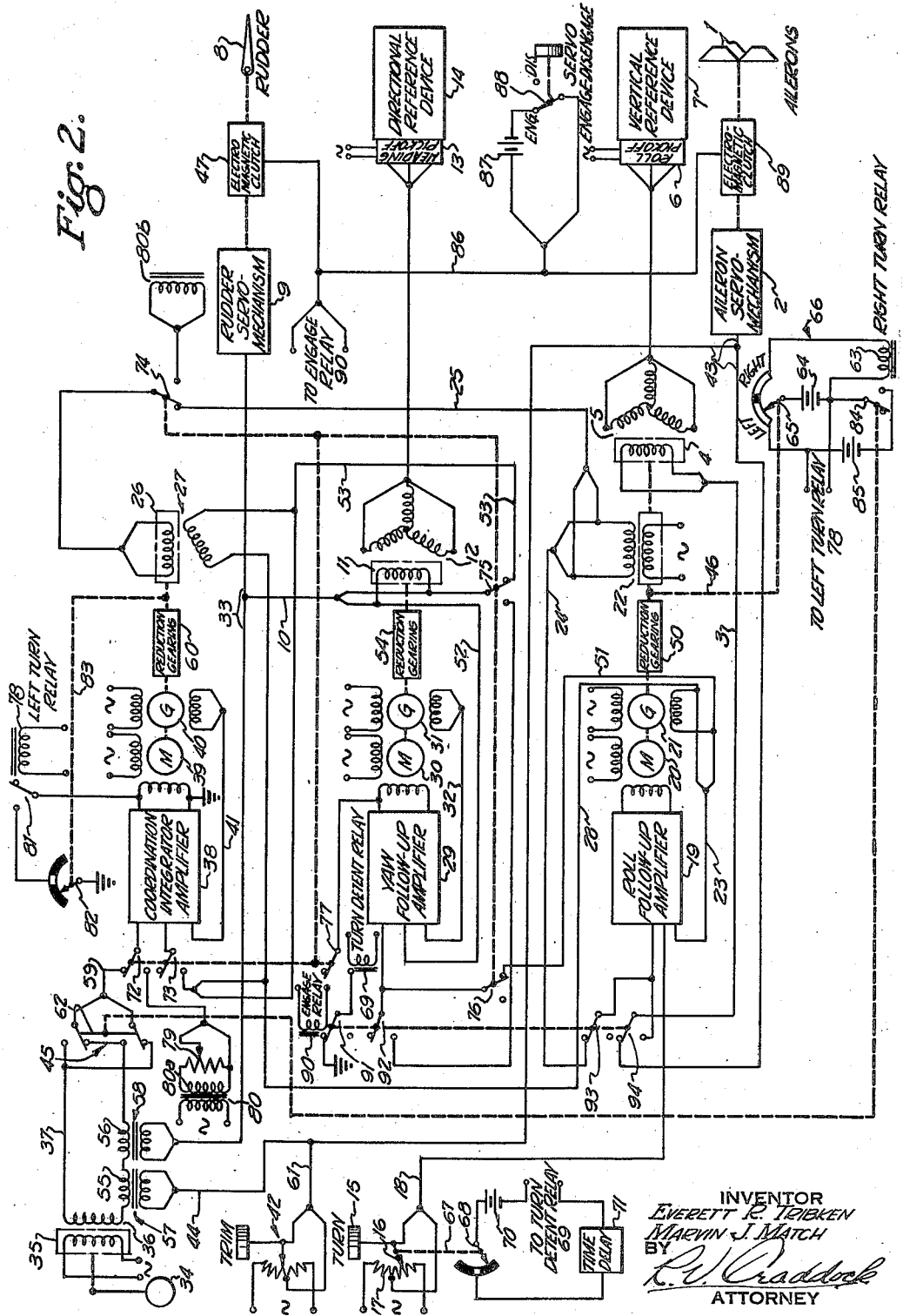
Fig. 2.
INVENTOR
*EVERETT R. TRIBKEN*
*MARVIN J. MATCH*
BY
ATTORNEY

United States Patent Office 2,829,848
Patented Apr. 8, 1958

2,829,848

AIRCRAFT CONTROL SYSTEM

Everett R. Tribken, Levittown, and Marvin J. Match, Valley Stream, N. Y., assignors to Sperry Rand Corporation, a corporation of Delaware Application March 31, 1954, Serial No. 419,978

11 Claims. (Cl. 244—77)

This invention relates to systems for the control of dirigible craft and more particularly to systems for controlling the turning of such craft from one heading to another.

In controlling the turn of a dirigible craft such as an airplane, for example, it is usually desirable to coordinate the turn. In other words, it is desirable to control the turn of the craft in a manner such that the craft has an apparent gravity angle of zero and is simultaneously prevented from side-slipping, i. e., slipping toward the center of a desired turning circle or skidding away from the center thereof. By apparent gravity angle, we mean the angle formed between the craft's apparent gravity vector and the vertical axis of the craft. To achieve this condition of turn coordination, the aircraft is generally banked upon entering a turn and the turn control system is relied upon for providing a proper correlation between the bank angle, the true airspeed of the craft, and the turning rate of the craft.

A number of different systems have been proposed heretofore for controlling a craft to execute coordinated turns in accordance with the foregoing. This number includes systems which measure side-slip either directly or approximate the same and use this direct measure or approximation to control one or more of the aforesaid factors to be correlated.

A direct measure of side-slip can be obtained in some instances from a wind-vane suitably mounted on the craft. However, the air turbulence and assymetrical air currents encountered at present-day speeds of travel, as well as the drag produced by wind-vane mountings themselves, have made it exceedingly difficult to obtain satisfactory results from this means. It has also been suggested heretofore that a pendulum pivoted about the fore and aft axis of the craft, or a suitable lateral acceleration-responsive means, will provide a direct measure of side-slip, since it has long been thought that side-slip in turns is always reduced substantially to zero when the apparent gravity angle of the craft is substantially zero, i. e., when the apparent gravity vector is perpendicular to the floor of the craft. However, it is not necessarily true during a turn that both side-slip and apparent gravity angle will be zero at the same time. In other words, a considerable amount of side-slip may prevail even though the apparent gravity angle of the craft is substantially zero.

We have found that the amount of side-slip occurring in a turn is actually a function both of the apparent gravity angle of the craft and the amount of deflection the rudder has from its streamlined position. The relationship that exists in a rigid airplane between the apparent gravity angle $\sigma$, the amount of side-slip $\beta$, and the rudder angle $\delta_r$ is $$\sigma = C_1\beta + C_2\delta_r$$

where $C_1$ and $C_2$ are variables whose values depend on flight conditions such as altitude, airspeed, and loading. Notwithstanding their variable nature, however, we have found that $C_1$ and $C_2$ may be assigned average values for computing null $\beta$ from $\sigma$ and $\delta_r$ with an accuracy wholly sufficient for such computation. Hence, if $\sigma$ is zero, it follows that $\beta$ will be proportional to $\delta_r$.

In order, therefore, to obtain a true measure of side-slip from a device indicating the apparent gravity angle, it is necessary to alter such indication by an amount in proportion to the rudder angle. Accordingly, the present invention, in one of its aspects, provides an arrangement for performing this operation so as to make available an improved measure of true side-slip for the purpose of correcting a turn for any miscoordination during the execution thereof.

Our system includes a conventional arrangement for stabilizing a craft about its roll and yaw axes. The respective reference attitudes to which the craft is flown, however, are made variable in a novel manner whereby the craft may be caused to execute turns at substantially zero apparent gravity angle with substantial freedom from side-slip. In this connection we have provided means for smoothly and gradually offsetting the roll attitude reference a selected amount from an initial value normally corresponding to a level attitude. The amount of roll reference offset determines a fixed or selected bank angle for the craft. Another offsetting means is provided in a manner such that the heading attitude reference may be given a continuously changing offset while the roll attitude reference is offset by the first offsetting means. The rate of change of the heading reference offset is controlled to attain a steady-state preliminary value which the craft, through its yaw stabilization apparatus, tends to match with its turning rate. This preliminary rate of turn, however, is arbitrary; and actually it is correct for coordination purposes at the selected bank angle for but one speed of the craft relative to the supporting medium. When this particular craft speed obtains, side-slipping tendencies are absent and the actual heading of the craft substantially keeps in step with the continuously varying reference heading. Hence, except when entering or leaving a turn, craft rudder is maintained substantially undeflected from its zero displacement or streamlined position.

However, when a different craft speed obtains at the selected bank angle, the arbitary rate at which the reference heading is varied differs from the rate at which the craft can turn without employing a steady-state application of rudder. Hence, the yaw stabilization system develops the heading error required to produce the amount of rudder displacement needed to make the actual rate of change of heading of the craft substantially equal to the arbitrary rate of heading reference offset. If the rate of heading reference offset is greater than the proper turning rate for coordination, the craft will tend to skid while it is executing its turn; and if the offset rate is less, a tendency toward slipping will occur. These tendencies toward side-slipping, however, are substantially reduced by an arrangement responsive to the heading error for varying the arbitrary rate of heading reference offset in the appropriate sense. By this arrangement, the heading error and the turning rate of the craft attain values somewhat closer to their proper values; and in the absence of a coordinating arrangement that we provide, the improved turning rate depends on the maintenance of a sustained or steady-state heading error. But, the coordinating arrangement so provided serves to reduce the heading error to zero and to vary the heading reference offset rate until the proper rate for turn coordination is attained.

In brief, the coordinating arrangement accomplishes the foregoing result by providing a measure of side-slip from the apparent gravity and rudder angles, and employing such measure to modify the heading reference offset rate until these angles are substantially reduced to zero, whereupon side-slip is likewise substantially reduced to zero thereby to satisfy all the requirements for a closely coordinated turn.

An object of our invention, therefore, is to provide an improved and novel system for controlling a dirigible craft to execute closely coordinated turns.

Another object is the provision of an improved turn control system for controlling an aircraft to turn at the proper rate for coordination over a wide range of selected bank angles and true airspeeds.

Another object is to provide a novel arrangement in a dirigible craft for deriving a measure of the craft's sideslip for measures of its apparent gravity angle and rudder deflection, and for employing such measure of side-slip for varying an arbitrary turning rate imparted to the craft until said apparent gravity angle and rudder deflection are reduced to zero.

Anther object is to provide in the system of the preceding object a novel arrangement for trimming the craft to a wing-down attitude and simultaneously modifying the measure of side-slip proportionately such that the craft coordinates its turns to its trim condition.

Another object is the provision of an improved system for coordinating the turns of an aircraft wherein an arbitrary turning rate imparted to the craft is varied in accordance with the time integral of craft side-slip.

Another object is to provide means for offsetting the roll attitude reference of an aircraft automatic pilot a selected amount and for offsetting the pilot's yaw attitude reference continuously at a rate controlled in accordance with a measure of side-slip derived from measures of the craft's apparent gravity angle and rudder angle so as to cause the craft to bank to its offset reference roll attitude and execute a coordinated turn thereat.

Another object is the provision of a novel turn control system in accordance with the foregoing objects wherein the control movements imparted to the craft are executed gradually and smoothly, notwithstanding abrupt and erratic input commands to the system.

With the foregoing and still other objects in view, our invention includes the novel combinations and arrangements of elements described below and illustrated in the accompanying drawings, in which:

Figs. 1 and 2 are schematic circuit diagrams of an aircraft control system embodying our invention; Fig. 1 showing the connections in effect during a turning maneuver and Fig. 2 further showing switching means for rearranging certain of the connections for operation during non-turning periods.

The control system shown in the drawings is arranged, for illustrative purposes, to control an airplane having conventional apparatus for stabilizing the craft about its roll and yaw axes. Referring to Fig. 1, the roll-stabilizing portion of this apparatus, for example, comprises a pair of ailerons 1 drivably connected to the output of a servomechanism 2 of well-known type controlled in accordance with the departures of the craft from a normally level reference roll attitude. In this regard, servomechanism 2 includes an amplifier which is preferably connected via cables 3 and 43 to receive a roll signal from the rotor 4 of a selsyn-like device, preferably a synchro control transformer 5 connected back-to-back with a synchro generator 6 arranged as a pick-off on the roll axis of a gyroscopic vertical 7. The roll signal is preferably matched within servomechanism 2 by a positional repeatback signal in a well-known manner to insure that the displacement given the ailerons is in accordance with the roll signal.

The yaw-stabilizing portion of the craft's stabilizing apparatus comprises a rudder 8 drivably connected to the output of a servomechanism 9 substantially identical to servomechanism 2, but controlled in accordance with the departures of the craft from a reference yaw attitude or heading. In this regard, servomechanism 9 is preferably connected via cables 10 and 33 to receive a heading signal from the rotor 11 of a selsyn-like device, preferably a synchro control transformer 12, connected back-to-back with a transmitter 13 of similar winding configuration constituting the transmitter of a conventional directional reference device or compass 14 such as, for example, a magnetically-slaved directional gyroscope. The heading signal is preferably matched within servomechanism 9 by a positional repeatback signal in a well-known manner to insure that the displacement given the rudder is in accordance with the heading signal.

With this arrangement, the craft may be controlled both to assume and maintain a bank attitude other than its normal level attitude simply by angularly displacing the rotor 4 of synchro 5 from its normal position relative to the stator of said synchro. Such displacement offsets the initial or normal reference bank attitude; hence, the stabilization apparatus, in functioning to control and stabilize the craft to whatever reference attitude prevails, controls the craft to fly at the new or offset bank attitude. In a similar fashion, the craft may be controlled to assume a different heading simply by angularly displacing the rotor 11 of synchro 12 from its normal position relative to the stator of said synchro. Such displacement offsets the initial or reference heading attitude; hence, in this event the stabilization apparatus controls the craft to fly at the new or offset heading.

A manually-adjustable knob 15, hereinafter termed turn-control knob, is provided for selectively positioning a wiper 16 along a center-tapped potentiometer 17 having an output cable 18 connecting said wiper and center-tap to the input of a conventional amplifier 19 capable of mixing and amplifying A. C. signal inputs thereto. Potentiometer 17 is energized from a suitable source of alternating current such that a signal of magnitude and phase in accordance with the movement of wiper 16 away from the center-tap is fed to amplifier 19. A motor 20 is energized by the amplified signal and is adapted to drive a tachometer-type generator 21 and reduction gearing 50, the output of the latter being drivably connected to the rotor of a selsyn-like rotary transformer device 22 and rotor 4 of synchro 5. Generator 21 is preferably of the A. C. output type, and provides an output of a magnitude and phase in accordance with the rate at which it is driven. The rate output is connected via a cable 23 in follow-up or degenerative fashion to the input of amplifier 19 such that motor 20 is driven at a rate proportional to the magnitude of the signal on cable 18. The rotor of transformer 22 is energized from a suitable source of alternating current so as to induce a signal current in its associated stator of a phase and magnitude in accordance with the direction and angular distance through which it is driven. A cable 24 from device 22 connects this signal in follow-up fashion to the input of amplifier 19 such that motor 20 is driven through an angular distance in accordance with the input signal on cable 18. Hence, motor 20 is controlled to drive rotor 4 of synchro 5 both at a rate and through an angular distance dependent on the movement imparted to turn control knob 15, thereby to cause the craft gradually to bank to a selected bank angle at a selected rate due to the knob-controlled offset given the craft's roll attitude reference.

The bank follow-up signal induced in the stator of transformer 22 is also fed via a cable 25 to the rotor 26 of a selsyn-like rotary transformer device 27. Thus excited, rotor 26 induces a proportional signal current in its associated stator which is connected via leads 28, 51, 52, and 53 to feed this signal in combination with other signals to be described to the input of an amplifier 29, generally similar to amplifier 19. A motor 30 is energized in accordance with the amplified signal and is connected by suitable mechanical means to drive a generator 31 (substantially identical to generator 21) and reduction gearing 54, the output of the latter being drivably connected to the rotor 11 of synchro 12. The rate signal output of generator 31 is fed via a cable 32 in follow-up fashion to amplifier 29 such that rotor 11 is driven at a rate dependent on the input to the amplifier, and the offset thereby effected on the heading reference attitude is, accordingly, varied at the same rate. Unlike the selected amount of offset given to the bank attitude reference, however, the amount of heading reference offset in a turn maneuver undergoes a continuous variation, due to the omission of displacement follow-up in the loop containing motor 30. Hence, the craft's stabilization system during such heading reference variation causes the craft to change its heading at the same rate as the reference variation; and if this rate differs from that required for coordination, side-slipping occurs and it is necessary to hold a steady-state rudder deflection.

The heading error signal fed to servomechanism 9 via cables 10 and 33 is also fed via leads 53, 28, 51, and 52 to amplifier 29 in a manner such as simultaneously to change the driving rate of reference offsetting motor 30 in the sense to reduce side-slip. Both driving rate and heading error then attain new steady-state values which are closer to the values required thereof for coordination, but which are still such as to cause side-slip, rudder deflection, and too great an apparent gravity angle.

In order, therefore, to achieve full coordination, we provide an auxiliary or coordinating arrangement for varying the driving rate of reference offsetting motor 30 until the deflection of the rudder and the apparent gravity angle are substantially reduced to zero, whereupon side-slip is substantially reduced to zero. This arrangement preferably comprises a pendulum 34 pivoted about the fore and aft axis of the craft near the craft's center of gravity and arranged by suitable mechanical connections to displace the rotor 35 of an A. C.-excited selsyn-like rotary transformer device 36 from a null position thereof in response to lateral accelerations imparted to the craft. By lateral accelerations we mean those accelerations that are directed wholly or component-wise in the direction of the transverse axis of the craft, i. e., parallel to a line joining corresponding points on the wing-tips of the craft. A signal proportional to such lateral acceleration is generated in the stator of transformer 36 and is fed via a lead 37 and a series-connection of the secondary windings 55, 56, respectively, of a pair of transformers 57, 58 to a phase-reversing device 45 mechanically actuated in accordance with the direction of turn by a connection 46 to the shaft of rotary transformer 22, as will presently be more fully described.

Transformers 57, 58 are provided for mixing two additional signals with the pendulum signal of rotary transformer 36. In this regard, the primary of transformer 58 is connected by cables 33 and 10 to be energized by the heading error signal developed in synchro 12, while the primary of transformer 57 is energized by a biasing signal, the origin and purpose of which will subsequently be more fully treated herein. Thus, phase-reversing device 45 actually receives a composite signal input proportional to the algebraic sum of individual signals representing the swing of the pendulum and the heading error. Since the swing of the pendulum is a measure of the apparent gravity angle and since the heading error is a measure of the rudder angle, the composite signal input is therefore a measure of side-slip, as appears from the previously-noted equations for a rigid airplane.

From device 45, the composite or side-slip signal is fed via a cable 59 to an amplifier 38 generally similar to amplifiers 19 and 29. The output of amplifier 38 is connected to energize a motor 39 which is mechanically connected to drive a tachometer-type generator 40 (substantially identical to generators 21, 30) and reduction gearing 60, the output of the latter being drivably connected to the rotor 26 of rotary transformer 27. Generator 40 is connected via a cable 41 to provide its rate signal output in the follow-up or degenerative relation to amplifier 38 whereby motor 39 drives rotor 26 at a rate proportional to the algebraic sum of the amplifier input signals or the side-slip of the craft. In this fashion, the bank follow-up signal from rotary transformer 22 supplied to yaw follow-up amplifier 29 via rotary transformer 27 for establishing an arbitary turning rate is modified on the occurrence of side-slip in an amount proportional to the integral of side-slip such that the input to amplifier 29 is actually proportional to both the bank angle and the integral of side-slip.

As rotor 26 is driven by motor 39, the speed of heading reference offset motor 30 is thereby controlled to approach the proper speed for coordination. Accordingly, side-slip, rudder angle, and apparent gravity angle are simultaneously diminished. Rotor 26 soon reaches a position whereat motor 30 attains said coordination speed. This position is thereafter maintained for the duration of the turn so long as the bank angle and true airspeed are unchanged, since upon attainment of coordination, motor 39 loses the energization it previously derived from pendulum-actuated transformer 36 and yaw error synchro 12 due to the apparent gravity angle and rudder angle becoming substantially zero.

In view of the A. C. excitation which device 27 receives from bank follow-up device 22 and a phase reversal thereof that occurs when going from a left bank to a right bank and vice-versa, and in view of a common non-reversing reference phase being employed for the respective excitations of pendulum transformer 36, heading error synchro 12, and the primary of biasing transformer 57, it is necessary in order always to provide the proper phase sense of the signal entering yaw follow-up amplifier 29 to reverse the phase of this signal on going from one commanded bank or turn direction to the other. Accordingly, we have placed phase-reversing device 45 in controlled relation to the direction of bank by means of mechanical connection 46 from the rotor shaft of roll follow-up device 22. Device 45 may take a number of suitable forms, one of which is illustrated in Fig. 2 and hereinafter described in detail.

Prior to the commencement of a turning maneuver, rotor 26 of rotary transformer 27 is preferably rotated to an initial position intermediate of one of its positions of maximum coupling and a null position adjacent thereto. The exact intermediate position is a matter of choice; but in order to reduce the time required for achieving coordination to an absolute minimum, we suggest that the position chosen be the one that occurs for a coordinated turn at the most frequently employed combination of selected bank angle and true airspeed. Thus located, rotor 26 may be driven by coordination integrator motor 39 at least forty degrees on one side or the other of its initial position without cutting off the bank angle component of the input to yaw follow-up amplifier 29. This range of rotary movement is considerably greater than the operational range of movement contemplated for rotor 26 during a turn.

The rotation of rotor 26 to its initial position may be effected either manually or automatically. We prefer to make the adjustment automatically, and have illustrated a preferred arrangement in Fig. 2 by which this operation is accomplished, as will hereinafter be described.

In regard to another feature of our system, it is well-known that most aircraft, upon entering or leaving a turn, experience by virtue of their own peculiar characteristics an adverse yaw in some cases, and in other cases an aiding yaw. That is to say in illustration of adverse yaw, on operating the craft's controls to cause a left turn, the craft will initially react by yawing to the right, then shortly thereafter commence the ordered left turn. And in illustration of aiding yaw, the craft will initially react in the ordered direction, but at a faster rate than the rate occurring shortly thereafter as ordered. In both instances, the smoothness of the turn is disrupted an objectionable amount. Therefore, we provide an arrangement integrated into our system for overcoming this undesired yaw reaction. In this regard, the rate signal from bank rate generator 21, besides being fed to amplifier 19 is also fed via leads 51 and 28, 53, 52, to the input of yaw follow-up amplifier 29. Thus, depending on the sensing chosen for the bank rate signal relative to the other components of the input to amplifier 29, the turning rate at the beginning and ending of a turn (while bank angles are being established) will be made either faster or slower to cope with the initial yaw reaction of the craft. A faster turn rate, of course, is desired in the case of adverse yaw; and, conversely, a slower turn rate is desired in the case of aiding yaw.

Another arrangement integrated into our system is provided for trimming the aircraft to a sustained wing-down or bank attitude such as would, for example, be necessary to maintain zero side-slip with an outboard engine dead, and for simultaneously applying a biasing correction to the pendulum signal so as effectively to shift its null value to correspond with the side-slip eliminating bank trim of the craft. Accordingly, we provide a knob-controlled A. C. excited potentiometric signal-generator 42 substantially identical to the turn command potentiometric assembly 15—17, but arranged to feed its A. C. signal via cables 61 and 43 to the input of aileron servomechanism 2 and via a cable 44 to the primary winding of transformer 57. By actuating trim generator 42 a selected amount away from its null output position, the craft may thereby be caused, through the signal on cable 43, to assume the bank angle necessary to trim the craft to zero slide-slip under asymmetric thrust or loading conditions, while the signal on cable 44 effectively serves to shift the null output position of pendulum transformer 36 to a position corresponding to this bank angle, whereby the turns of the craft are coordinated to the new trim condition.

In order to leave or recover from a turn, the pilot of the craft, as with prior art rate-of-turn-type turn control systems, watches a heading indicator until the craft's heading is nearly at the desired heading, whereupon he commences his recovery maneuver. Recovery is begun in our system by restoring turn command knob 15 to its center position. This causes motor 20 to be actuated in a manner gradually and smoothly to shift the roll attitude reference back to its initial value, whereupon the roll stabilization apparatus causes the craft to level out. Simultaneously, by virtue of the diminishing bank command signal on lead 25, the speed at which the heading attitude reference is being offset is gradually reduced to zero. Hence, a heading error is developed on cables 10, 33 in a sense to move rudder 8 in the direction to arrest the turn of the craft; and the computed side-slip integral monitoring of the rate of heading attitude reference offset continues to maintain coordination throughout the recovery process. The new heading of the craft will differ from the initial heading thereof by an angular amount equivalent to the total offset given by motor 30 to the heading attitude reference.

In describing the foregoing control system embodying our invention, we have thus far limited our discussion for purposes of simplicity, to the particular arrangement (Fig. 1) that obtains from the moment a turn is begun to the moment it is completed. For other conditions of flight, however, we deem it preferable to modify the arrangement in certain respects which differ according to whether or not the ailerons and rudder are drivably engaged to their respective servomechanisms during energization of the system.

In Fig. 2, we have taken the drawing of Fig. 1 and added thereto a number of relays and associated connections and devices by which the circuitry just described may be rearranged to advantage during periods when it is not employed for turning the craft. Fig. 2 shows our system as it is arranged when the aileron and rudder servos are engaged and when turn knob 15 is displaced from its detent position for a left turn.

Device 45, for reversing the phase of the signal input on cable 59 on going from one direction of turn or bank to the other, preferably includes a double-pole double-throw reversing switch element 62 in cable 59 forming part of a relay 63 which is energized from a battery 64 by the driving of a rotatable wiper 65 by roll follow-up connection 46 onto the right-hand contact segment of a sliding-contact switch 66 when a right turn is commanded.

On returning turn knob 15 to its detent position, a mechanical connection 67 from the knob to a switch 68 closes switch 68 to energize a relay 69 through a battery 70. A time delay device 71 in the switch circuit serves to interpose a sufficient preselected delay between the return of knob 15 to detent and the energization of relay 69 to permit the craft to recover from the turn for purposes which will hereinafter become apparent. Delay device 71, for example, may be of a conventional thermal type; and we have found in practice that a delay in the neighborhood of eight seconds meets our needs satisfactorily.

Turn detent relay 69 includes six sets of single-pole double-throw switch elements 72–77. On energization of the relay, switch element 72 is operated to remove the pendulum, trim, and yaw error signal inputs to coordination integrator amplifier 38 and substitute therefor a constant preselected voltage input from a potentiometer 79 connected across one secondary winding 80a of a transformer 80 suitably energized from a source of constant peak potential alternating current. Switch element 73 is operated to connect the stator of integrator transformer 27 in follow-up relation to amplifier 38, while switch element 74 removes the excitation which rotor 26 of transformer 27 receives from the stator of rotary transformer 22 and substitutes therefor an excitation source of constant peak potential alternating current from another secondary winding 80b of transformer 80. Switch elements 75, 76 are operated to disconnect yaw error synchro 12, coordination transformer 27, and roll tachometer 21 from the input to yaw follow-up amplifier, while switch element 77 is operated to short-circuit the control winding of yaw follow-up motor 30.

Roll follow-up connection 46 drives wiper 65 of the left turn contact segment of switch 66 to an open contact position midway between the left and right segments. By this actuation of switch 66, a relay 78 is thereby disconnected from battery 64 to close a single-pole double-throw switch element 81 in series with a sliding-contact switch 82. The latter switch has its movable or wiper portion driven by a mechanical connection 83 from the rotor shaft of coordination transformer 27 such that the switch is open for any position of rotor 26 other than its restored or initial preselected position. When switches 81, 82 are both closed, they serve to short-circuit the control winding of coordination integrator motor 39 to prevent the same from displacing rotor 26. Hence, motor 39 is disabled only after it has first been gainfully employed to drive the rotor 26 to its initial preselected position. The breadth of the open contact portion between the segments at switch 66 is chosen to limit the operation of turn relays 63, 78 to commanded bank angles in excess of a given amount, preferably in the neighborhood of ±2°.

Essentially the same sequence of operations is again brought about by switch 66 on recovery from a right turn. Wiper 65 is driven to center from a position on the right turn contact segment of switch 66. Right turn relay 63 is thereby deenergized to open a single-pole double-throw switching element 84 in circuit with a battery 85 and a winding of left turn relay 78. Hence, relay 78 is deenergized to close switch element 81, whereby to permit the subsequent disabling of motor 39 as before on the return of rotor 26 to its preselected position.

By the arrangement thus far described, after a preselected interval following the restoral of turn knob 15 to its detent position midway on potentiometer 17, coordination integrator motor 39 is controlled by an input signal from potentiometer 79 and a follow-up signal from winding 80b to restore rotor 26 of rotary transformer 27 to a preselected initial position intermediate adjacent null and maximum coupling positions thereof. After such restoral, motor 39 is prevented by switches 81, 82 from further operation. Moreover, the heading or yaw error signal, the rate of roll command signal, and the side-slip integral signal are removed from the input of the yaw follow-up amplifier, and the output of the amplifier is shorted to prevent any possible driving of yaw follow-up motor 30 so long as the rudder and ailerons are drivably connected to their respective servomechanisms. Hence, motor-driven rotor 11 of heading error synchro is prevented from making any further variations in the reference heading, and the craft's yaw stabilization apparatus maintains the craft at the unvarying reference heading, i. e., on a straight course of flight. Also, in view of the zero turn signal input to roll follow-up amplifier 19, the craft's roll stabilization apparatus maintains the craft at a level attitude (assuming no trim signal on cable 43), since rotor 4 of roll reference synchro 5 is driven and kept at its level attitude reference position by the follow-up connection of roll transformer 22 to amplifier 19.

In order to disengage and engage rudder 8 from and to the output of rudder servomechanism 9, we have interposed a suitable electromagnetically-operated clutch 47 therebetween and have electrically connected the same in a well-known manner via a cable 86 to a battery 87 through a manually-operated single-pole double-throw switch 88. Ailerons 1 are similarly disengaged and engaged from and to the output of ailerons servomechanism 2 by means of a clutch 89 interposed therebetween which is substantially identical to clutch 47 and operated by the same switch and battery. Also arranged to be energized by battery 87 and switch 88 when the latter is in its engage or closed position is a relay 90 which includes four sets of single-pole double-throw switch elements 91–94. On disengaging the servos from the control surfaces by opening switch 88, switch element 91 is operated to remove the short-circuit from the control winding of yaw follow-up motor 30. At the same time, switch element 92 is operated to connect rotor winding 11 of heading error synchro 12 to the input of yaw follow-up amplifier 29; switch element 93 is operated to disconnect the stator winding of roll transformer 22 from the input of roll follow-up amplifier 19; and switch element 94 is operated to disconnect rotor 4 of roll reference synchro 5 from the input of aileron servomechanism 2 and connect said rotor to the input of roll follow-up amplifier 19.

By this arrangement, with the control surfaces disengaged from their respective servomechanisms, rotor 11 is driven by motor 30 to maintain a null output, i. e. to synchronize rotor 11 with the heading of the craft such that substantially no heading error signal exists at the moment clutches 47, 89 are operated to engage the servos. Similarly, rotor 4 of roll reference synchro 5 is synchronized with the roll attitude of the craft such that substantially no roll error signal exists at the moment the servos are engaged. Moreover, it will be apparent, by virtue of this arrangement and the arrangement obtaining with the servos engaged, that if the craft is at a bank attitude other than level at the time the servos are engaged, the craft will automatically be restored to a level attitude and thereafter be stabilized to maintain the same. And, of course, if trim potentiometer 42 is actuated, the craft will, instead, be restored to the trim attitude commanded by said potentiometer.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A turn control system for dirigible craft comprising bank means for selectively banking said craft, a control surface adapted on displacement from a given position thereof to change the heading of said craft, means defining a variable reference heading, means for controlling said displacement in accordance with the difference between actual craft heading and the variable reference heading, acceleration-responsive means for providing a measure of the apparent gravity angle of the craft for the bank angle selected by said bank means, means for modifying said measure in accordance with the displacement of said control surface, and means for varying said variable reference heading at a rate dependent upon said modified measure of apparent gravity angle.

2. A turn control system for dirigible craft comprising bank means for selectively banking said craft, a control surface adapted on displacement from a given position thereof to change the heading of said craft, means defining a variable reference heading, means for controlling said displacement in accordance with the difference between craft heading and the variable reference heading, acceleration-responsive means for providing a measure of the apparent gravity angle of the craft, means for modifying said measure in accordance with the displacement of said control surface, and means for varying said variable reference heading at a rate dependent upon a selected bank angle and upon said modified measure of apparent gravity angle.

3. A turn control system for dirigible craft comprising bank means for selectively banking said craft, a control surface adapted on displacement from a given position thereof to change the heading of said craft, means for displacing said control surface from said given position in accordance with the difference between craft heading and a variable reference heading, means for providing a measure of the lateral acceleration of the craft, means for modifying said measure of lateral acceleration in accordance with the displacement of said control surface, and means connected in controlled relation to the output of said bank means and the output of said modifying means and in controlling relation to said control surface displacing means for varying said variable reference heading at a rate proportional to said modified measure of lateral acceleration.

4. A turn control system for dirigible craft comprising bank means for selectively banking said craft, a control surface adapted on displacement from a given position thereof to change the heading of said craft, means for displacing said control surface from said given position in accordance with the difference between craft heading and a variable reference heading, means for providing a measure of the lateral acceleration of the craft, means for modifying said measure of lateral acceleration in accordance with the displacement of said control surface, and means connected in controlled relation to the output of said bank means and the output of said modifying means and in controlling relation to said control surface displacing means for varying said variable reference heading at a rate proportional to the bank selected and said modified measure of lateral acceleration.

5. A turn control system for dirigible craft comprising bank means for selectively banking said craft, heading reference means for providing a first signal proportional to departures of the craft from a reference heading, control surface means adapted to respond to said first signal for turning said craft, means for providing a second signal proportional to lateral accelerations of said craft at the bank angle selected by said bank means, and means connected to said heading reference means for varying said reference heading at a rate dependent on the algebraic sum of said second and first signals.

6. A turn control system for dirigible craft comprising bank means for selectively banking said craft, heading reference means for providing a first signal proportional to departures of the craft from a reference heading, control surface means adapted to respond to said first signal for turning said craft, means for providing a second signal proportional to lateral accelerations of said craft, and means connected to said heading reference means for varying said reference heading at a rate dependent on the amount of bank selected and the algebraic sum of said second and first signals.

7. A turn control system for dirigible craft comprising bank means for selectively banking said craft, heading reference means for providing a first signal proportional to departures of the craft from a reference heading, variable means connected to said heading reference means for varying said reference heading at a rate dependent on the amount of bank selected, control surface means adapted to respond to said first signal for turning said craft, means for providing a second signal proportional to lateral accelerations of said craft, and means connected to said variable means for varying the rate of said reference heading variation produced for a given amount of selected bank in proportion to the time integral of the algebraic sum of said second and first signals.

8. A turn control system for dirigible craft comprising bank means for selectively banking said craft, means for providing a first signal proportional to the amount of bank selected, heading reference means for providing a second signal proportional to departures of the craft from a reference heading, means connected to said heading reference means in controlled relation to said first signal for varying said reference heading at a rate dependent on the magnitude of said first signal, control surface means adapted to respond to said second signal for turning said craft, means for providing a third signal proportional to lateral accelerations of said craft, and means connected to said first signal providing means for varying the output thereof in proportion to the time integral of the algebraic sum of said third and second signals.

9. A turn control system for dirigible craft comprising bank means for selectively banking said craft, means for providing a first signal proportional to the amount of bank selected, heading reference means for providing a second signal proportional to departures of the craft from a reference heading, means connected to said heading reference means in controlled relation to said first signal for varying said reference heading at a rate dependent on the magnitude of said first signal, control surface means adapted to respond to said second signal for turning said craft, means for providing a third signal proportional to lateral accelerations of said craft, means connected to receive said second and third signals for providing a fourth signal proportional to the time integral of the algebraic sum of said second and third signals, and means included in said first signal providing means for multiplying said first signal by said fourth signal whereby to adjust the turning rate of said craft sufficiently to correct for any miscoordination that might obtain in said turn during the execution thereof.

10. A turn control system for an aircraft comprising means operable during flight for maintaining said craft at a reference roll attitude, means connected to said first-recited means for offsetting said reference roll attitude a selected amount at a rate proportional to said selected amount of offset, said offsetting means including means for providing a gradually increasing first signal having an ultimate value proportional to the amount of offset selected, and means for providing a second signal proportional to said offset rate, said second signal being of a duration substantially limited to the interval of said increase of the first signal, heading reference means for providing a third signal proportional to departures of the craft from a reference heading, control surface means adapted to respond to said third signal for turning said craft, means for providing a fourth signal proportional to lateral accelerations of said craft, and means connected to said heading reference means for continuously varying said reference heading at a rate proportional to the algebraic sum of said second signal and the product of said first signal and the time integral of the algebraic sum of said fourth and third signals.

11. A turn control system for dirigible craft comprising first and second servo loops respectively including an amplifier, servomotor, and signal generating means for generating displacement and rate feedback signals for said amplifier; a third servo loop comprising an amplifier, servomotor, and signal generating means for generating a rate feedback signal for said amplifier; command signal generating means for providing a turn signal to the input of said first servo loop; roll means connected to the output of the servomotor of said first servo loop for banking the craft away from a reference roll attitude in proportion to said turn signal; acceleration responsive means for providing a coordination control signal proportional to lateral accelerations of the craft, said acceleration signal being connected as a first input to said third servo loop; means for transmitting the displacement feedback signal of said first servo loop to the input of said second servo loop, said transmission means including means driven by the output of said third servo loop for varying said first servo loop displacement feedback signal input to said second servo loop by an amount proportional to said third servo loop output; means for transmitting the rate feedback signal of said first servo loop to the input of said second servo loop; means for connecting the displacement feedback signal of said second servo loop as a second input to said third servo loop in a sense to add to said acceleration signal; and heading means responsive to the output of said second servo loop for continuously turning the craft away from a reference heading substantially at a rate proportional to the rate at which the servomotor of said second servo loop is driven.

References Cited in the file of this patent

UNITED STATES PATENTS

| | | |
|---|---|---|
| 2,450,907 | Newton et al. | Oct. 12, 1948 |
| 2,567,922 | Brannin et al. | Sept. 18, 1951 |
| 2,617,615 | Von Eschen | Nov. 11, 1952 |
| 2,649,264 | Slater et al. | Aug. 18, 1953 |